H. S. BUSBY.
ADJUSTABLE BEAM AND FRAME FOR SULKY AND GANG PLOWS.
APPLICATION FILED DEC. 15, 1909.
958,091.
Patented May 17, 1910.
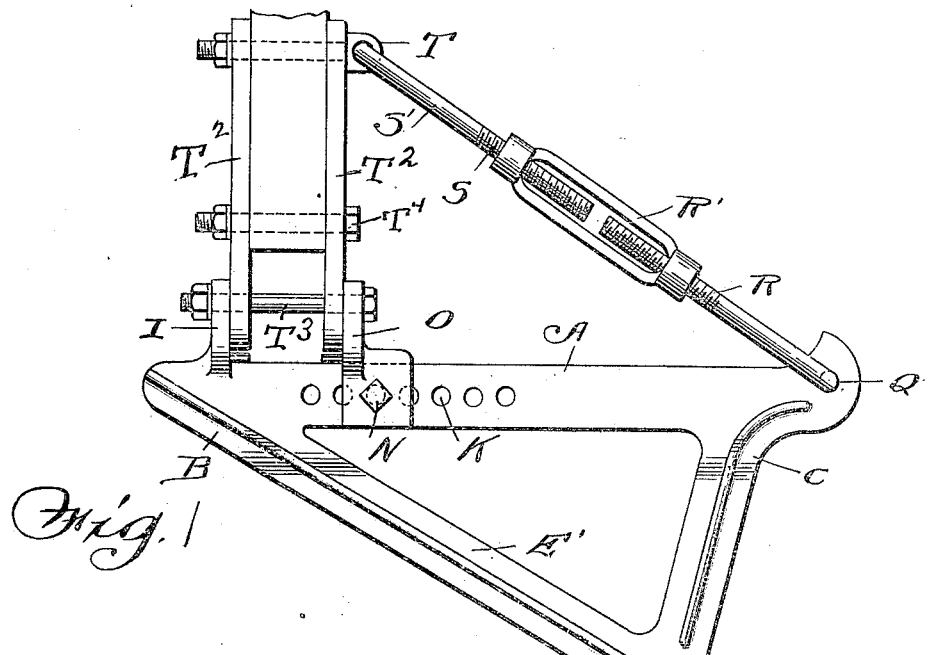
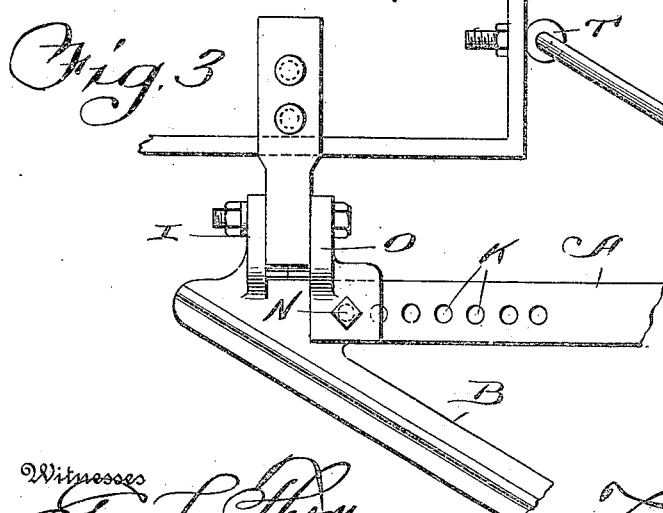
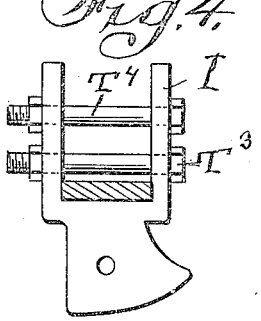
Witnesses
Inventor
H. S. Busby
By Franklin H. Hough
Attorney

UNITED STATES PATENT OFFICE.

HARLEY S. BUSBY, OF GIRARD, KANSAS.

ADJUSTABLE BEAM AND FRAME FOR SULKY AND GANG PLOWS.

958,091. Specification of Letters Patent. Patented May 17, 1910.

Application filed December 15, 1909. Serial No. 533,255.

*To all whom it may concern:*

Be it known that I, HARLEY S. BUSBY, a citizen of the United States, residing at Girard, in the county of Crawford and State of Kansas, have invented certain new and useful Improvements in Adjustable Beams and Frames for Sulky and Gang Plows; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in adjustable beams and frame hitches for sulky, gang plows, etc., and comprises a simple and efficient device of this nature, the object of which is to adopt means for taking up side draft and prevent interference with the team and tongue with the plow, and forming a simple and efficient means for regulating the plow to cut an even furrow.

My invention is illustrated in the accompanying drawings in which:—

Figure 1 is a top plan view of the device. Fig. 2 is an edge view. Fig. 3 is a top plan view of the frame showing the adjustable jaw thereon, and Fig. 4 is a detail sectional view.

Reference now being had to the details of the drawings by letter, A designates the frame which is of general triangular shape, two sides of which are designated by letters B and C, and are divided each having two arms designated respectively by letters E and E′, which are spaced apart, and through the angled portion of said arms are formed apertures for the reception of the lag bolt H, to which a double tree is adapted to be attached. One arm of said frame is provided with fixed jaw I, and the arm from which said jaw projects is provided with a series of apertures K, through which a lag screw N is adapted to pass and also through registering apertures of the adjustable jaw O. Said jaw O has a slot for the reception of the arm upon which it slides and coöperates with the fixed jaw I to engage plow frames of different widths. Connected to an aperture Q formed in a projecting portion of the frame is a draft hook R having threaded shank portion engaged by the turnbuckle R′, which in turn engages the threaded end S of a hook S′.

T designates an eye-bolt which is adapted to be passed into the frame T′ of the plow and to which the draft hook S′ is adapted to be connected. Said frame has plates $T^2$ held to the frame by means of bolts $T^4$ and said plates are pivotally connected by means of bolts $T^3$ with the apertured lugs I.

By the provision of an adjustable beam and frame hitch for sulky, gang plows, etc., it will be noted that the side draft will be taken up and interference with the team and tongue prevented, and by the adjustable features the plow may be easily regulated to cut an even furrow.

What I claim to be new is:

1. An adjustable frame hitch for sulky and gang plows, comprising a triangular shaped frame, two of the sides of which are divided, a lag bolt adapted to be held in registering apertures in the angled positions of the divided sides and to which a double tree is adapted to be connected, adjustable means for fastening the frame to a plow, and an adjustable side draft rod adapted to connect said frame with a plow frame, as set forth.

2. An adjustable frame hitch for sulky and gang plows, comprising a triangular shaped frame, two of the sides of which are divided, a lag bolt adapted to be held in registering apertures in the angled portions of the divided sides and to which a double tree is adapted to be connected, and means for attachment to a plow, an adjustable side draft rod having a hooked end for attachment to one end of said frame and a second hook for attachment to the frame of a plow, as set forth.

3. An adjustable frame hitch for sulky and gang plows, comprising a triangular shaped frame, two of the sides of which are divided, a lag bolt adapted to be held in registering apertures in the angled portions of the divided sides and to which a double tree is adapted to be connected, a fixed jaw upon one side of the frame, a movable jaw having a slot for the reception of the side from which said fixed jaw projects, said movable jaw and the side of the frame upon which it is mounted, having apertures, a lag bolt adapted to pass through registering apertures in said movable jaw and the side, double side draft mechanism, consisting of two hooks having threaded shank portions with a turnbuckle engaging the threaded portions thereof, one of said hooks adapted for attachment to said frame, and the other to a plow frame, as shown and described.

In testimony whereof I hereunto affix my signature in the presence of two witnesses.

HARLEY S. BUSBY.

Witnesses:
SAMUEL J. KELLOGG,
J. W. MOORE.